Sept. 20, 1955 E. W. TODD 2,718,183
HITCH FOR MOUNTED IMPLEMENTS
Filed May 7, 1952 2 Sheets-Sheet 1
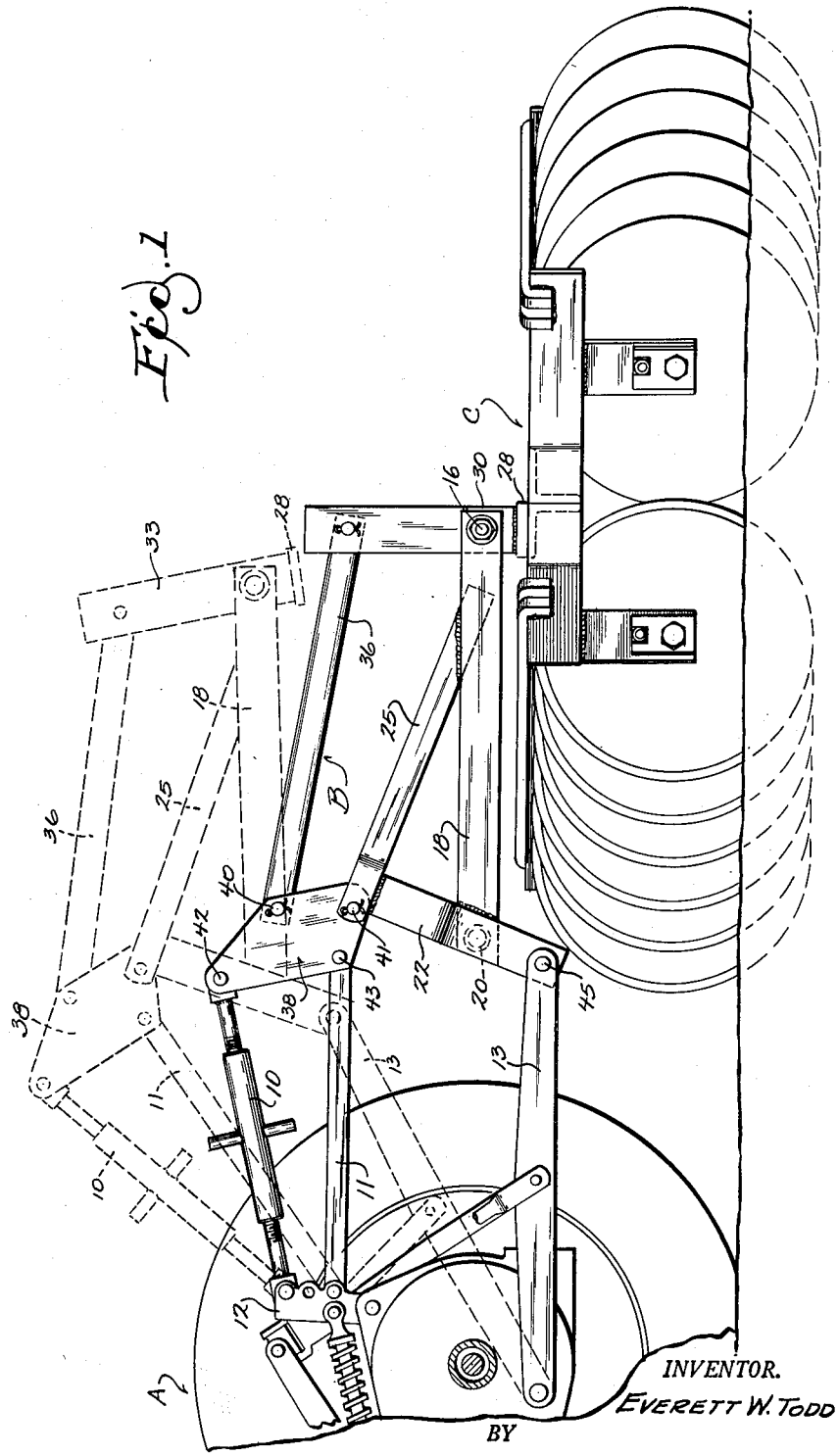
INVENTOR.
EVERETT W. TODD
BY
James E. Nilles
ATTORNEY

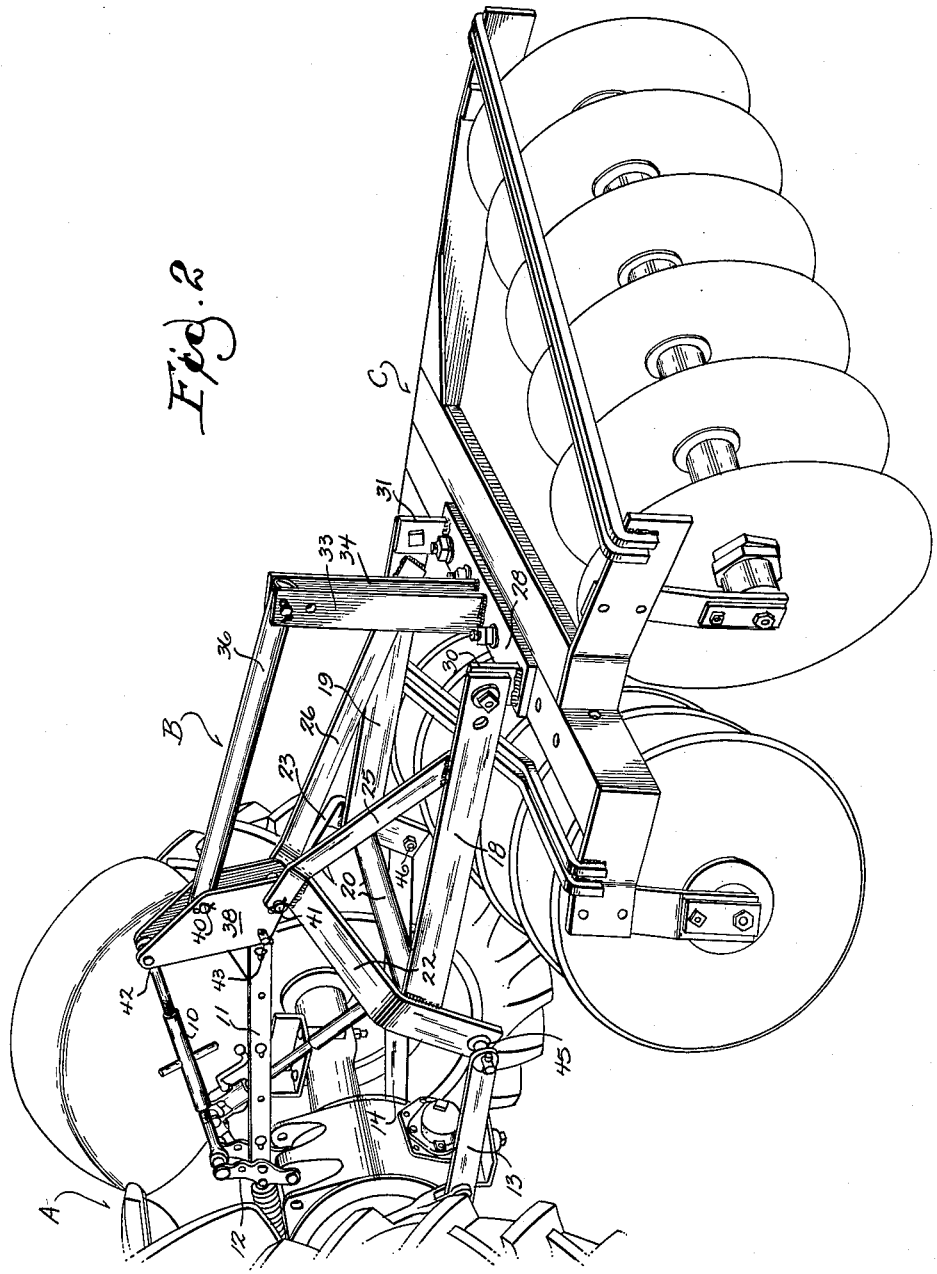

United States Patent Office 2,718,183
Patented Sept. 20, 1955

2,718,183

HITCH FOR MOUNTED IMPLEMENTS

Everett W. Todd, Racine, Wis., assignor to Massey-Harris-Ferguson Inc., a corporation of Maryland Application May 7, 1952, Serial No. 286,554

5 Claims. (Cl. 97—46.07)

This invention relates generally to hitches for mounting earth working implements directly to a tractor. More specifically, it relates to "three points," "parallel link" or similar hitches and finds particular utility in directly coupling a heavy and large implement, such as a disk harrow, to a tractor.

In the embodiment shown, the tractor is of the well known type having the conventional three-point linkage and draft control mechanism which is actuated by the thrust on the top link.

Due to the geometry of the conventional three-point hitch, the implement is not raised in a horizontal position, but is given an additional amount of lift at its rearward end. The outer end of the regular top link pivots about a smaller radius than the outer ends of the lower links causing the rigid implement frame to be tilted forwardly at the top thus giving the rear end of the frame additional lift. Therefore, because of the geometry of the conventional hitch and the fact that the frame is rigid, the distance between the outer ends of the top and lower links remains constant and the frame is not raised in a parallel position. The higher the frame is raised, the faster the rear end of frame raises, i. e., the frame is moving fastest at the upper part of its travel. This causes a very non-uniform load on the hydraulic lifting system; the load being progressively greater as the hitch is raised. This not only causes an uneven load on the system during the lifting cycle, but it causes a greater total lifting effort to be thrown on the hydraulic system. This has been a limiting factor in the use of heavier implements and restricted the total weight which could be carried by a given hydraulic system.

It is, therefore, an object of this invention to provide a hitch for mounting an implement to a tractor which will cause an implement to be lifted in such a manner so as to create a uniform power requirement on the power system and which will allow the tractor to lift a heavier implement at a given hydraulic pressure.

It is an object of this invention to provide a hitch which will create a uniform power requirement on the hydraulic system during the entire lifting cycle and which utilizes the standard parts and points of connection on the conventional tractor.

It is a further object of this invention to provide a hitch which will create a uniform power requirement on the hydraulic system during the lifting cycle; allow the draft control mechanism of the tractor to function in a proper manner regardless of the weight imposed by the implement and also use the same standard points of connection on the tractor.

The advantages inherent in the above stated objects and other advantages will become readily apparent as this disclosure progresses and particularly points out the various features of this invention. Accordingly, the present invention may be considered as comprising the various constructions, combinations or sub-combinations of parts as is hereinafter more fully set forth in the detailed description and in the claims, reference being had to the accompanied drawings in which:

Figure 1 is an elevational view of one embodiment of my improved hitch showing the raised position of the hitch in dotted lines.

Figure 2 is a perspective view.

Referring more particularly to the drawings, the tractor A carries the hitch frame B by means of the regular top link 11 and the two lower laterally spaced draft links 13 and 14. The power lift mechanism raises the hitch through lift arms—which are connected to draft links 13, 14 in the well known manner. The implement frame C as shown here comprises the conventional front and rear gang frames of a disk harrow suitably connected together. The implement frame is bolted to the hitch frame as will more fully appear.

In the particular embodiment shown, I have illustrated the device as having two top links both attached to the standard link rocker 12 which is pivotally mounted on the tractor. The uppermost link 10, which is adjustable in length is the thrust link and it actuates the draft control mechanism (not shown) of the tractor in the well known manner (see patent to Ferguson, 2,118,180 issued May 24, 1938) due to the ground reaction on the implement. The lower top link 11 which I will call the regular top link is pivotally attached to a less sensitive part of the link rocker and its primary purpose is to carry the weight of the implement and allow the thrust link to react normally to draft forces on the implement without being influenced by the weight of the implement itself. Thus, through the use of the two top links, the automatic draft control mechanism is allowed to function normally at all times regardless of the weight imposed on it by the implement. Such an arrangement is disclosed in the patent to Fraga, 2,456,693, issued December 21, 1948.

Heretofore, in implements of this kind, the hitch frame to which the top and lower links were connected was rigid; that is, the distance between the outer ends of the upper and lower links was constant. Thus, when the links were raised, this conventional frame was tilted forwardly which raised the rear end of the implement an additional amount. In my improved hitch, I make provision for the outer ends of the links to be closer together in the raised position than they were in the lowered or working position by providing an articulate frame which decreases the distance between the outer ends of the links as the hitch is raised, rotates the hitch frame and thereby raises the hitch frame in a substantially horizontal position at all times. I accomplish this function and still use the same geometry as the conventional three-point hitch and, therefore, utilize the inherent benefits of such converging linkage and standard points of connection.

The hitch frame B comprises a rigid section made up of the laterally spaced longitudinal members 18, 19, crossbar 20, A members 22, 23 and braces 25, 26 which are all rigidly connected together, preferably by welding. A transverse member 28 is pivotally attached to longitudinal members 18, 19 through studs 30, 31 which are welded to transverse member 28 at either end thereof. Rigidly secured to the central portion of member 28 are the upstanding posts 33, 34 which together with member 28 form a movable section of the hitch. The implement frame C is detachably but rigidly secured to transverse member 28 and together with the movable sections forms a ground actuated sub-frame, which pivots on the rigid section of the hitch frame at 16. Thrust member 36 is pivotally attached to the posts 33, 34. A common connecting member 38 complete the hitch frame and pivotally connects with thrust member 36 at 40 and with the A members 22, 23 at 41. Upper links 10 and 11 are pivotally attached to common member 38 at 42 and 43 respectively. Draft links 13, 14 are pivotally connected to the rigid section of the hitch frame at 45, 46 respectively.

The draft control mechanism of the tractor is actuated by the ground reaction on the implement transmitted through the sub-frame, thrust member 36, common member 38, thrust link 10 and the link rocker 12.

My articulating hitch frame makes provision for raising the implement at a constant speed by decreasing the vertical distance between the rear ends of the regular link 11 and the draft links 13, 14 as the implement is raised. Referring to Figure 1 it can be seen that in the raised position, common member 38 is tilted forwardly at the top which reduces the distance between the rear ends of link 11 and draft links 13, 14 and forces the upper part 41 of the rigid section rearwardly thus keeping it in substantially the same position and raising it at a constant rate during the entire lifting cycle.

It will now be seen that I have provided a hitch which will allow the hydraulic system of a tractor to handle a heavier implement than it could otherwise handle with a conventional hitch and still utilize to the fullest extent the inherent benefits of the conventional converging linkage. This is especially desirable in the case of an implement such as a disk harrow where weight is an important factor in the proper operation of the implement.

While the device described forms a particularly compact and efficient arrangement when used in conjunction with a draft control system which is an inherent part of the tractor, it can be seen that it is not necessarily limited to the embodiment shown. This hitch, which provides an articulating connection between the regular top link and the lower draft links and keeps the hitch frame in a substantially constant angular position relative to the ground, will function equally well with other tractors having different lift systems. It is now obvious that other linkages could be used to cause the connecting member to function as described. The result is the same however; that of reducing the lifting effort required and creating only a uniform load on the lifting system throughout the lifting cycle.

It will be manifest that hitches other than those detailed in the above description, may be made to present forms other than those illustrated without departing from the spirit of the invention or scope of the appended claims.

Having thus described the invention, what is claimed as new and desired to be secured by Letters Patent is:

1. A hitch for coupling an implement to a tractor having a pair of draft links pivoted on the rear end portion thereof and having a power lift mechanism for elevating the same; said hitch comprising, a rigid section pivotally connected with said draft links, a ground actuated sub-frame pivotally attached to said rigid section, a common member pivotally connected to said rigid section, a thrust member pivotally connected to said common member and to said subframe; a link rocker operatively associated with said power lift mechanism, a regular top link pivotally connecting said link rocker and said common member, a thrust link pivotally connecting said link rocker and said common member, the points of pivotal connection between said common member and said rigid section, regular top link and thrust link all being spaced apart a distance from each other in a longitudinal plane.

2. A hitch for attachment to a tractor having a pair of lower draft links and a shorter regular top link pivoted on the rear end portion thereof; said hitch comprising, a rigid section pivotally connected to said draft links and adapted to support an implement, a common member pivotally attached to said regular top link at one location and to said rigid section at a second location so as to form an articulating connection therebetween, a thrust link pivotally attached to said common member at a third location and said tractor and so constructed and arranged that said rigid frame will maintain substantially the same angular position relative to the ground regardless of its vertical position, the points of pivotal connection at said one location, second location and third location all being spaced apart from one another in a longitudinal plane.

3. A hitch for attachment to a tractor having a pair of laterally spaced draft links trailingly pivoted on its rear end portion and connected to a power lift device on the tractor for vertical shifting movement of said links; comprising, a rigid frame section arranged to span said links and pivotally attached thereto, a movable section pivotally attached to said rigid section and adapted to receive an earth working implement, a common member pivotally attached to said rigid section at a first location; a thrust member pivotally attached to said common member and said movable section; a regular top link pivotally connected to said tractor and said common member at a second location, an upper thrust link operatively connecting said common member at a third location with said power lift device, said points of connection at first, second and third locations all spaced a distance apart in a longitudinal plane.

4. In combination with a tractor having a pair of laterally spaced lower draft links pivoted adjacent the rear end portion and also having a power lift mechanism for elevating said links; a rigid hitch section pivotally connected to the rear ends of said links, a ground actuated sub-frame pivotally connected to said rigid section, a thrust member connected at one end to said sub-frame, a link rocker pivotally attached to said tractor and operatively associated with said power lift mechanism, a thrust link pivotally attached to said rocker and extending rearwardly therefrom, a regular top link pivotally connected with the rear end of said tractor; a common connecting member pivotally connected at a first location with said rigid frame, at a second location with said thrust link and at a third location with said regular top link, said common member also pivotally connected to the other end of said thrust member, whereby said rigid section will maintain a substantially constant attitude relative to the ground regardless of its vertical position, said points of connection at first, second and third locations all being spaced apart in a longitudinal plane.

5. In combination with a tractor having a pair of laterally spaced lower draft links and a power lift mechanism for vertically swinging said draft links, a rigid hitch section pivotally attached to the rear ends of said links, a ground actuated sub-frame pivotally attached to said rigid section; a link rocker pivotally secured to the rear end of said tractor and connected with said power lift mechanism, a common connecting member pivotally attached at one location to said rigid frame, a thrust member pivotally connected to said sub-frame and to said common member, a regular top link pivotally connected to said rocker and to said common member at a second location, a thrust link pivotally connected to said rocker and to said common member at a third location whereby the rigid section will maintain a substantially constant attitude to the ground regardless of its vertical position, said points of connection at first, second and third locations all being spaced apart in a longitudinal plane.

References Cited in the file of this patent
UNITED STATES PATENTS

| Number | Name | Date |
| --- | --- | --- |
| 2,118,180 | Ferguson | May 24, 1938 |
| 2,456,693 | Fraga | Dec. 21, 1948 |
| 2,515,637 | Dooley et al. | July 18, 1950 |
| 2,575,622 | Fraga | Nov. 20, 1951 |
| 2,622,499 | Fraga | Dec. 23, 1952 |
| 2,654,304 | Wilson | Oct. 6, 1953 |